3,507,849
POLYMERIZATION OF ETHYLENE
Gregory W. Daues, Jr., Dickinson, Tex., assignor to Monsanto Company, St. Louis, Mo., a corporation of Delaware
No Drawing. Filed May 24, 1965, Ser. No. 458,401
Int. Cl. C08f 3/04
U.S. Cl. 260—94.9
3 Claims

ABSTRACT OF THE DISCLOSURE

Control of gel contamination during start-ups by washing the reactor with xylene containing a hindered phenol.

---

The present invention relates to an improvement in the process for manufacturing solid polymers of ethylene alone or conjointly with other polymerizable monomers at relatively high temperatures and pressures. More particularly, it relates to the control of gel contamination of the polymer during start-ups of the polymerization process under such conditions.

Normally solid high-molecular-weight polymers of ethylene are produced by subjecting ethylene or mixtures of ethylene and other polymerizable monomers to elevated temperatures while maintaining relatively high pressures, that is, pressures of at least 5,000 p.s.i. up to 40,000 to 50,000 p.s.i. Such high pressure polymerizations are usually conducted in the presence of small amounts of free-radical-generating catalysts or initiators such as, for example, oxygen, organic or inorganic peroxy type compounds such as benzoyl peroxide and ditertiary butyl peroxide, cumene hydroperoxide, potassium persulfate, or azo type compounds, for example, azo-bis-isobutyronitrile. Oxygen is one of the simplest and most effective of the catalysts or initiators. Thus, a mixture of ethylene containing a small quantity of free oxygen, such as less than 500 parts per million of oxygen based on the ethylene and preferably less than 200 parts per million of oxygen, when subjected to temperatures of 200° to 300° C. at pressures from 20,000 to 50,000 p.s.i. undergoes polymerization to form polyethylene. The yields will depend upon the reaction time but may range from 5 to 25 percent and perhaps even higher. See Fawcett et al., U.S. Patent 2,153,553 directed broadly to polyethylene; Perrin, U.S. Patent 2,188,465 directed to use of oxygen as catalyst for making polyethylene; Perrin et al., U.S. Patent 2,200,429 directed to polymerization of ethylene with comonomers.

The quality of polyethylene product with respect to molecular weight, flow characteristics, and other properties depends on a number of reaction variables including pressure, temperature, and, where oxygen is used as a catalyst, oxygen content. The poymerization is carried out under condlitions chosen to provide certain desired properties in the polyethylene product and, consequently, routine reactor shut-downs are scheduled between runs for changing polymerization conditions to make the various desired grades of polymers.

Other shut-downs of the polymerization reactor are forced because of mechanical failures or so-called "runaway" reactions. The polymerization of ethylene is highly exothermic. In order to produce a commercially valuable polyethylene product at a reasonable rate, it is often desirable to effect the ethylene polymerizations at reaction conditions that provide a rapid polymerization and that are only slightly less severe than those causing an uncontrolled polymerization in the nature of an explosion. Under such circumstances substantially close control is required. However, in practice it has been found that the operation of the reactor may be "lined out" for perhaps a number of hours, and the process apparently reached steady state conditions, when without apparent reason an uncontrollable explosive polymerization rate occurs. Thus, during the operation of such high pressure polymerization processes on a commercial scale, decompositions can occur frequently leading to frequent reactor shut-downs.

In the start-up of the polymerization reaction system following a shut-down for any reason, the polymer product is generally contaminated with gel of various types. The origin of such gel is uncertain. It is not known whether it is formed in the first stages of the polymerization reaction or is a carry-over from the previous shut-down formed, for example, by the reaction of air which may have entered the reactor with hot residual polymer therein. In any event, polymer quality is seriously affected and polymer containing such undesirable gel must be segregated and discarded. Thus, valuable feed and catalyst materials are lost, operation time is curtailed, and production schedules are delayed.

It has now been discovered that such disadvantages can be overcome and gel contamination in the polymer product made during start-ups in the process for the polymerization of ethylene at elevated temperatures and high pressures can be substantially reduced. This is accomplished according to the present invention by washing the polymerization reactor after shut-down and prior to start-up with a composition comprising a suitable solvent for polyethylene containing an appropriate amount of an antioxidant. Preferably, the washing composition comprises xylene and 2,6-di-tert-butyl-4-methylphenol.

The invention is illustrated in the following examples which, however, are not to be construed as limiting it in any manner whatsoever.

EXAMPLE 1

A series of experiments was conducted in which ethylene was polymerized in a tubular reactor having a length to diameter ($L/D$) ratio >200. The reactor was provided with a jacket through which a heat exchange fluid could be circulated for control of the reaction temperature. After each shut-down of the reactor and prior to its use for the next polymerization, the reactor was washed under pressure with xylene which was introduced not longer than two hours after the completion of the previous polymerization and while the reactor was maintained at a temperatuee from about 100° to 200° C.

The procedure employed was generally as follows:

Purified ethylene was subjected to preliminary compression and sufficient air to provide a quantity of oxygen in the range from about 5 to 50 p.p.m. was added to the ethylene. The gas mixture was then brought up to a reaction pressure between 20,000 to 40,000 p.s.i., preheated to a temperature from about 75° to about 150° C., and introduced into the inlet end of the reactor at a rate such as to maintain a reasonably constant pressure in the reactor. The exothermic heat of the polymerization in the reactor was removed by means of the cooling jacket, the reaction temperature being maintained from about 200° to 300° C. The reaction mixture was discharged through a let-down valve at the exit end of the reactor tube which dropped the pressure of the final reaction mixture of ethylene and ethylene polymer and controlled their flow into a separator. Separation of the polymer from the ethylene was effected and the polymer was evaluated by conventional methods to determine whether it met acceptable standards or specifications based on the particular polymerization conditions employed.

During an approximate 8-month period of operation as described above, 24 start-ups were made and all off-grade product, i.e., polymer contaminated by hard gel, was segregated subsequent to each start-up. Over the period of operation mentioned, average segregation time, i.e., the length of time the reactor had to be operated before it produced a satisfactory grade of gel-free polymer, was 11.5 hr.

EXAMPLE 2

The continuous process for the polymerization of ethylene described in Example 1 was operated over a period of about three months under varying conditions as described in that example except that the xylene used for washing the reactor after a shut-down and prior to the next start-up contained about 0.1% by weight of 2,6-di-tert-butyl-4-methylphenol. Over this period of time, 12 start-ups were made. The average segregation time in this case was only 5.7 hr. representing an average savings in reactor segregation time of 5.8 hr. and a significant increase in suitable polyethylene product per start-up over that of Example 1 where no additive was employed with the xylene.

Many variations in conditions from those given in the examples can be made without departing from the invention. For instance, while xylene (including any of the isomers or mixtures of them) has been shown as the solvent of the washing composition, any solvent which will dissolve polyethylene can be substituted. Aliphatic and aromatic hydrocarbons and their halogenated derivatives such as cyclohexane, the heptanes, the octanes, the nonanes, benzene, toluene, Decalin, Tetralin, carbon tetrachloride, n-butyl chloride, ethylene chloride, trichloroethylene and the like are all suitable. Likewise, the anti-oxidant added to the solvent may be chosen from any of a large variety of such agents. Phenolic compounds, in general, can be employed including, for example, phenol, resorcinol, pyrogallol, o-cresol, 2,6-xylenol, α-naphthol, β-naphthol, 2-thionaphthol, tert-butyl phenol, and the like. Particularly suitable are the hindered phenols, one of which has been exemplified and others of which include 2,6-tert-butyl-4-methoxyphenol, bis(2 - methyl-4-hydroxy-5 - tert - butylphenyl) sulfide, 2,2 - bis(4 - hydroxyphenyl) propane, bis(2-hydroxy-3 - tert - butyl - 5 - methylphenyl) methane, bis(2-hydroxy-3 - tert - butyl - 5 - ethylphenyl) methane, drying oil-soluble resinous condensation products of formaldehyde and alkyl- or phenyl-substituted monohydric phenol as, for example, oil-soluble condensation products of p-tert-amplphenol and formaldehyde, of p-phenylphenol and formaldehyde, and of mixtures of such phenols and formaldehyde. Thiobisphenols such as thiobisphenol, thiobis-m-cresol, 2,2'-thiobis-p-cresol, 4,4'-thiobis-(6-tert-butyl-m-cresol), 2,2' - thiobis-(6-tert-butyl-p-cresol), 2,2'-thiobis-(4,6-di - tert - butyl-m-cresol), thiobis-(3,4-xylenol), 4,4'-thiobis - (2,5 - xylenol), 4,4'-thiobis-(2-methyl-5-isopropyl phenol), and the like are also eminently suitable for use in the washing process of the invention. In addition, amines such as α-naphthylamine, N-methylaniline, phenyl-β-naphthylamine, diphenylamine and the like can also be employed.

The amount of anti-oxidant required in the washing composition is small. Generally, amounts from about 0.05 to about 5 percent by weight of the solvent are satisfactory while the preferred amounts are those in the range from about 0.1 to about 1.5 percent.

While the washing operation is described in the examples as being conducted at reactor jacket temperatures from about 100° to 200° C. under pressure, such conditions are only the preferred ones and are not absolutely essential for practicing the invention. The washing of the reactor can be done at a temperature just below the boiling temperature of the solvent and with only sufficient pressure to force the liquid washing composition through the reactor. However, such conditions can require an inordinate amount of time for clean-out and are impractical from the standpoint of commercial operations. At the temperatures mentioned above, suitable pressures for the reactor washing treatment are those in the range from about 1,000 to about 3,000 p.s.i.g.

The anti-oxidant-containing solvent to be effective must be added to the reactor at the earliest practical or opportune time and no later than two hours subsequent to the shut-down. Some degree of judgment must be exercised as to frequency of washing. If the reactor is to be shut down for four hours or more, the washing composition should be pumped into the reactor immediately as soon as this fact becomes known and allowed to remain there during the entire shut-down if possible. If the shut-down period is to be less than four hours, generally, no wash is required.

The polymerization reaction itself may be carried out in conventional equipment capable of withstanding the high pressures employed which are in the range from 5,000 p.s.i. to 60,000 p.s.i. with those ranging from 20,000 to 40,000 p.s.i. being preferred. Depending upon the catalyst used, the temperature may vary from 40° C. to about 400° C. It is generally preferred to operate at temperatures in the range from about 200° C. to 300° C.

In addition to the oxygen exemplified, any organic or inorganic compound which generates free radicals or a mixture of such compounds is suitable for use as the catalyst or initiator. Among examples of such materials are, for instance, per-oxygen type compounds which include organic peroxides and more especially dialkyl peroxides such as butyryl peroxide, lauroyl peroxide, benzoyl peroxide, diethyl peroxide, di-tert-butyl peroxide and the like; alkylhydroperoxides such as tert-butyl hydroperoxide or cumene hydroperoxide; organic peracids such as, for example, peracetic acid, perbenzoic acid or the esters thereof such as tert-butyl perbenzoate; diperoxydicarbonate esters such as di-isopropyl peroxydicarbonate; inorganic peroxides such as hydrogen peroxide or persulfates such as potassium persulfate. Other suitable initiators of catalysts are azo compounds such as azobisisobutyronitrile, methylazoisobutyrate, diethyl-2,2'-azobis-(2-methyl propionate) and oximes such as acetone oxime, etc. Only minor amounts of initiator are required. In general, initiator concentration will vary from about 0.0005% to about 2% of the total weight of material charged to the reactor.

The polymerization can be carried out in the additional presence of so-called polymerization modifiers or chain-transfer agents, if desired, to obtain certain polymer properties which such modifiers or chain-transfer agents may impart. The modifier can be any one or a mixture of the substances commonly used for this purpose such as saturated aliphatic hydrocarbons having from 1 to 8 carbon atoms, examples of which are the normal and branched chain acyclic paraffins such as propane, n-butane, isobutane, pentane, isopentane, hexane, and the like, cycloparaffins such as cyclopentane and cyclohexane, and alkyl cycloparaffins such as methylcyclohexane. Lower aliphatic aldehydes, i.e., those containing no more than five carbon atoms, as well as aromatic aldehydes such as benzaldehyde also give good results. Other suitable polymerization modifiers include alcohols such as isopropanol; aromatic hydrocarbons such as toluene or xylene; esters such as ethyl acetate or methyl formate; ethers such as tetrahydrofuran or dioxane; ketones such as acetone or methyl ethyl ketone; phenols, and various other substances such as hydrogen and carbon dioxide. The amount of the modifier initially present need not exceed 15 mole percent of the ethylene. Generally, from about 0.1 to about 15 mole percent based on the ethylene is used. The preferred amounts are those in the range from about 0.5 to 10 mole percent.

The process of the invention is not restricted to use only in the homopolymerization of ethylene. It is useful as well in processes where ethylene is copolymerized with other polymerizable compounds. Suitable comonomers include, for example, vinyl and vinylidene hydrocarbons having from 3 to 8 carbon atoms such as propylene, butene-1, isobutylene and other olefins and iso-olefins; halogen-substituted hydrocarbons such as vinyl chloride, vinyl fluoride, vinylidene chloride, vinylidene fluoride, 1,1-chlorofluoroethylene, etc.; vinyl esters such as vinyl acetate, vinyl butyrate, vinyl propionate; vinyl ethers including vinyl methyl ether, vinyl ethyl ether, vinyl octyl ether, and the like; acrylic acid, acrylonitrile, acrylic esters including methyl, ethyl, propyl, etc., acrylates; acrylamide; α-substituted acrylic acids, nitriles, esters, and amides such as methacrylic acid, methacrylonitrile, methyl methacrylate, ethyl methacrylate, methacrylamide, etc.; the acids, esters, and amides of α,β-ethylenically unsaturated dicarboxylic acids such as fumaric, maleic, citraconic, itaconic, etc., and the like.

What is claimed is:

1. In a process for the production of solid polymers of ethylene by polymerization of ethylene at temperatures from about 40° to about 400° C. and pressures from about 5,000 to about 60,000 p.s.i. in the presence of a free-radical-generating initiator, the improvement providing for reduction in gel contamination of said polymers which comprises washing the reactor in which said polymerization is effected after a shutdown and prior to startup with xylene containing a minor amount of a hindered phenol, said washing being effected no later than two hours subsequent to the shut-down at a temperature from about 100° to about 200° C. and a pressure from about 100 to about 3,000 p.s.i.

2. The improvement in the process as recited in claim 1 wherein the amount of said hindered phenol present in said xylene is from about 0.05 to about 5% by weight of said xylene.

3. The improvement in the process as recited in claim 2 wherein said hindered phenol is 2,6-di-tert-butyl-4-methylphenol.

References Cited

UNITED STATES PATENTS

| | | |
|---|---|---|
| 3,067,259 | 12/1962 | Bailey. |
| 3,338,879 | 8/1967 | Kutner. |
| 3,349,010 | 10/1967 | Plaster. |
| 2,989,516 | 6/1961 | Schneider. |
| 2,563,624 | 8/1951 | Small et al. _____ 260—94.8 |
| 2,989,516 | 6/1961 | Schneider. |
| 3,139,415 | 6/1964 | Speed et al. |

JOSEPH L. SCHOFER, Primary Examiner

S. M. LEVIN, Assistant Examiner

U.S. Cl. X.R.

260—78.5, 85.5, 86.7, 87.3, 87.5, 87.7, 88.1, 88.2